United States Patent [19]
Lofink

[11] 3,802,267
[45] Apr. 9, 1974

[54] GAS METER DIAPHRAGM

[75] Inventor: Joseph P. Lofink, Hebron, Ohio

[73] Assignee: Universal Lancaster Corporation, Dallas, Tex.

[22] Filed: Feb. 5, 1973

[21] Appl. No.: 329,542

[52] U.S. Cl............. 73/279, 92/98 D, 92/103
[51] Int. Cl............. G01f 15/16, F16j 3/00
[58] Field of Search............. 73/262, 269, 270, 271, 73/278, 279, 406, 407; 92/93, 98, 98 D, 99, 103, 105

[56] References Cited
UNITED STATES PATENTS

| | | | |
|---|---|---|---|
| 2,715,336 | 8/1955 | Schaus | 73/278 |
| 3,113,592 | 12/1963 | Mercier | 92/98 R X |
| 3,314,291 | 4/1967 | Anderson | 73/278 |

Primary Examiner—Jerry W. Myracle
Assistant Examiner—John P. Beauchamp
Attorney, Agent, or Firm—Roy B. Moffitt

[57] ABSTRACT

Disclosed is a one-piece meter diaphragm used in gas flow registering or recording meters. Making up the diaphragm is an outer, annular-shaped, mounting rim composed of a metal annulus embedded in an elastomer; an inner, annular-shaped flexing portion integral with said mounting rim and composed of an elastomer, the flexing portion comprising a first sidewall disposed essentially perpendicular to that plane in which the mounting rim lies and integral with the inner periphery of same; a second sidewall spaced apart from said first sidewall, bonded to and essentially perpendicular to a center pan; and, a median portion disposed between and integral with both said sidewalls of a thickness greater than said sidewalls.

4 Claims, 3 Drawing Figures

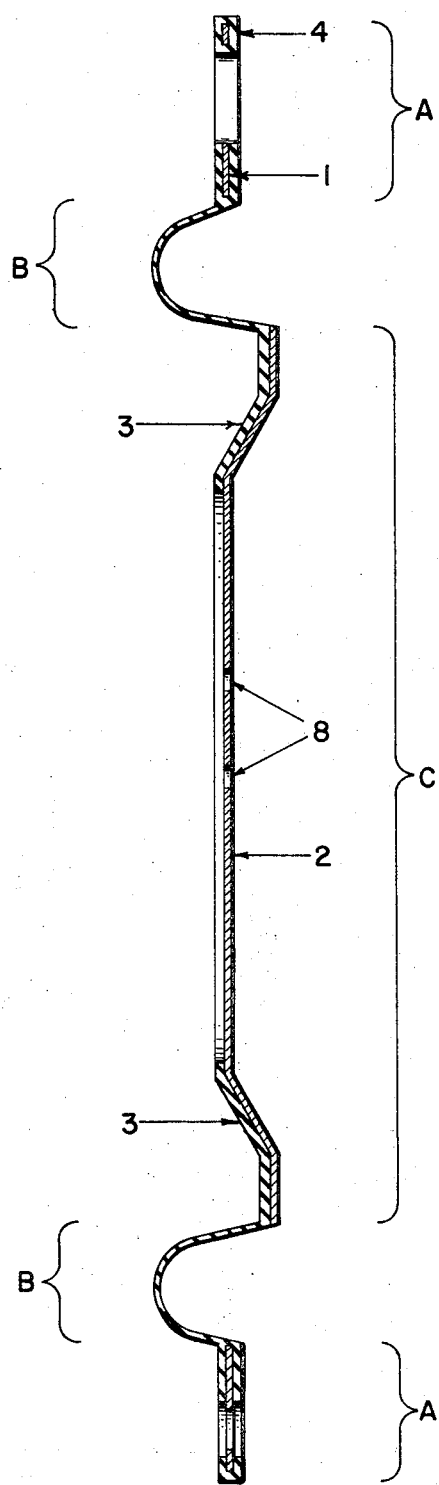
FIGURE: 2

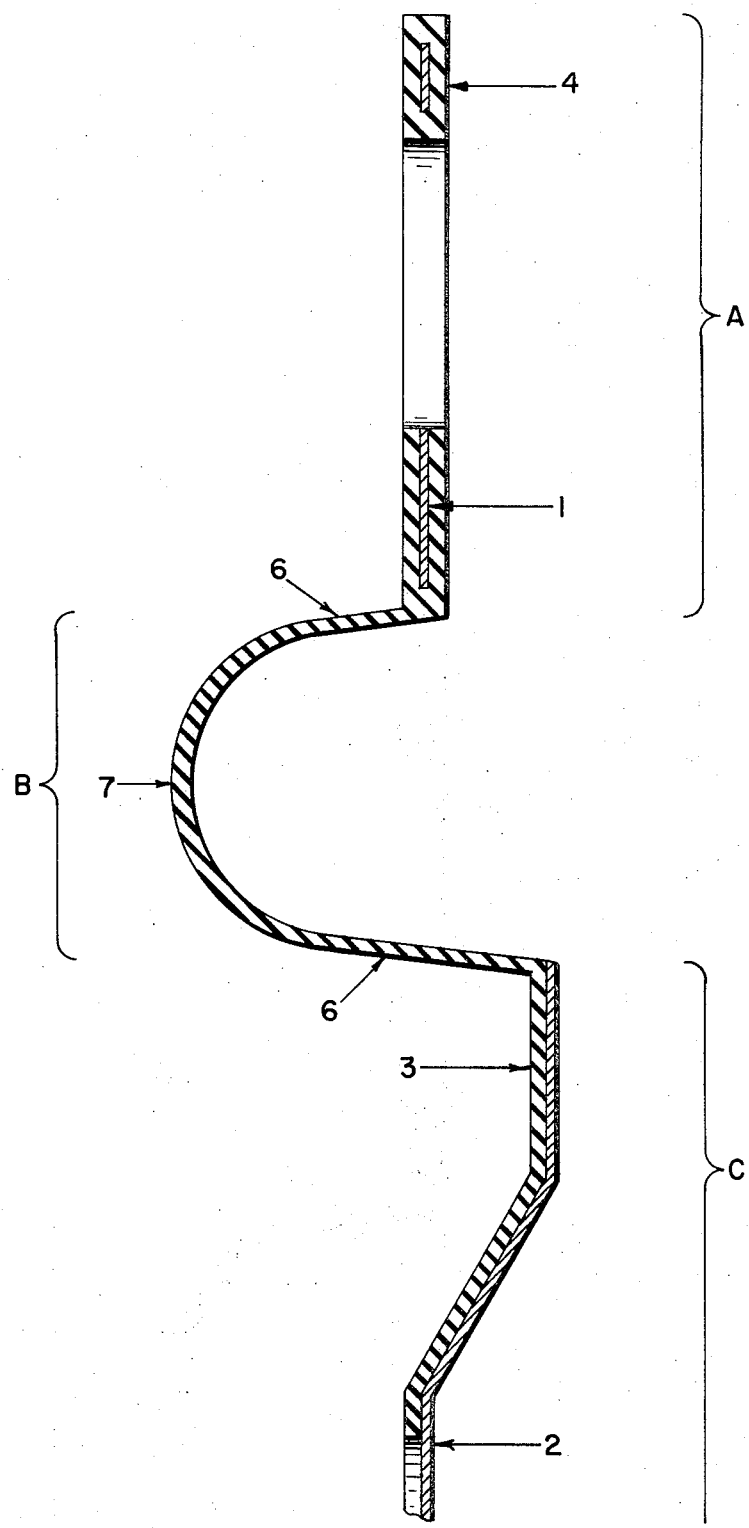
FIGURE: 3

GAS METER DIAPHRAGM

BACKGROUND OF THE INVENTION

The present invention is concerned with diaphragm devices of the pulsatory type employed in gas flow registering or recording meters. Heretofore, such diaphragm devices have been commonly formed to provide an outer, frame-forming annular-shaped rim, the rim being composed of rigid, thin sheet materials, such as sheet metal or the like. In service, the rim is clamped, when operatively installed in association within the meter, between relatively united but separable meter casting members. These rims, are heretofore constructed, have had their inter peripheral edges formed with various and sundry flanges disposed in substantially perpendicular relation to the planes occupied by the thin, flat, body portion of the rims. The purpose of these lateral flanges is to mechanically fasten the rim to the outer circumferential edge portions of flexible diaphragm bodies, usually made of leather or rubber. It is this flexing portion that is adapted to oscillate back and forth upon the application of unbalanced gas pressure to the opposite side, this gas pressure being provided for in the construction and operation of such meters.

In conventional diaphragm devices, the diaphragm was literally made from at least three distinct elements, namely, an outer frame-forming annular rim composed of sheet metal, an annulus flexing portion, which formed the flexible entity of the diaphragm body, and a rigid center portion, usually disc shaped. All three of these elements had to be physically and mechanically attached one to the other. Such was achieved by providing a metal rim in which the inner peripheral edge region was formed with a concentric wall formation projecting laterally to one side of the plane of the rim proper to form an annular open sided groove for receiving the outer circumferential edge portion of a flexible diaphragm. Arrangement of the groove and the rim provided a flexing or fulcruming edge. Such a structure is shown in U. S. Letters Pat. No. 2,715,336, to one K. L. Schaus (73-278), the entire disclosure being expressly herein incorporated by express reference.

Prior art disclosure of gas meter diaphragms always required that gasket materials be used with the outer, frame-forming annular rim, when the diaphragm was placed into service in a gas meter. Usually cork or other materials were employed for this purpose.

Prior art gas meter diaphragms have a number of disadvantages from a manufacturing and quality standpoint, stemming from their physical make-up. First of all, there were three parts with which to contend, i.e., there was an assembly problem from which quality control problems arose. Secondly, these three parts had to be mechanically attached, one to another, this requiring that a center pan be mechanically attached to a flexible portion by means of flanges. An outer rim portion also had to be mechanically attached to the flexing portion by a flange. Thirdly, prior art gas meter diaphragms when in service required the use of two gaskets, one to go on each side of the outer, frame-forming annular rim.

The instant invention overcomes all of these disadvantages. Instead of joining three distinct pieces to make the diaphragm, there are no pieces. Instead of two gaskets to contend with in assemblying the diaphragm into the gas meter, no gaskets are needed. A gasket is integrally molded with the diaphragm itself. In any mechanical joining operation, where one piece is mechanically jointed to another, there is always the chance that misalignment and mistakes will occur. Such are not tolerable in the gas meter industry. The instant invention avoids this drawback by having all alignments and all attachments made in a mold where the alignments are exceedingly simple to maintain and install. The attachments are positive and not subject to error (misalignment) because of the mold structure itself.

SUMMARY OF THE INVENTION

The disclosed invention consists of a one-piece gas meter diaphragm that can, for the sake of ease of understanding, be divided into three parts, all integrally molded together into one piece. In the manufacture of the diaphragm, a disc-shaped center pan is accurately centered in the middle of a mold and a sheet metal annulus-shaped outer frame-forming annular rim is disposed concentric with the center pan. A space is provided between the outer periphery of the center pan and the inner periphery of the outer rim. The mold is then closed and an elastomer is injected into the mold and allowed to set up. The elastomer adheres to the center pan and completely surrounds and embeds the sheet metal outer rim. The space between the center pan and the outer rim (flexing portion) is composed of elastomer only and has a U-shaped cross-section configuration. The sidewalls of the flexing portion (legs of the U) are essentially perpendicular to the outer rim and the center pan respectively. Both sidewalls are integral with one another by means of median portion integral with the two. The median portion of the flexing portion has a thickness greater than the sidewalls and can be less than that of the mounting rim, i.e., the outer frame-forming annular rim embedded in the plastic.

With the aforementioned disclosure in view, the invention's novel features of construction are illustrated by the accompanying drawings, wherein:

FIG. 2 is a general vertical sectional view taken through the diaphragm on the line 2—2 of FIG. 1; and, FIG. 3 is a detailed vertical sectional view taken through the diaphragm on the line 3—3 of FIG. 1.

DESCRIPTION OF THE PREFERRED EMBODIMENT

Figure 1:
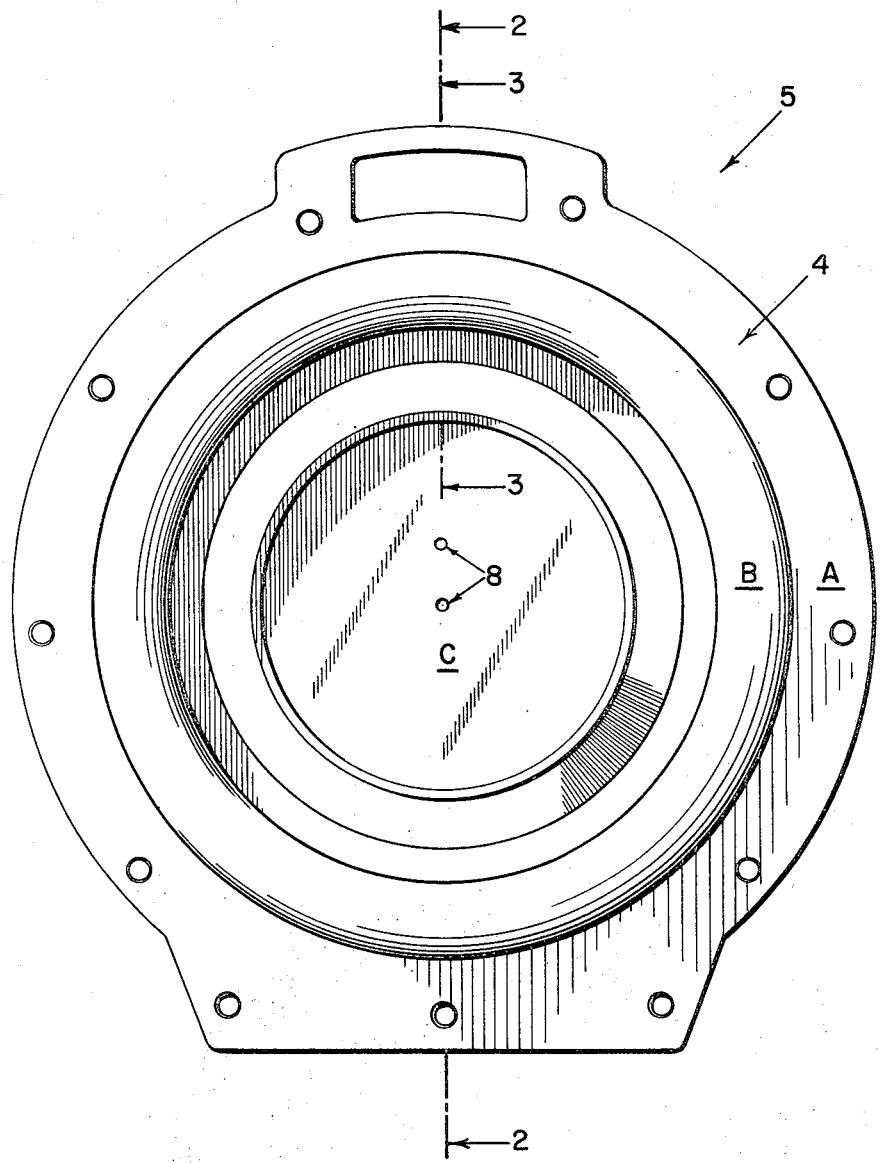
FIG. 1 is a front elevation of a gas meter diaphragm formed in accordance with the invention.

Referring to the specific form of the invention, as it has been illustrated in the above drawings, the numeral 5, see FIG. 1, indicates the diaphragm as a whole. Element 1 is the outer, frame-forming annular rim of the diaphragm structure. It will be noted that this metal part of the rim structure is essentially embedded in an elastomer 4, at least to the extent the elastomer covers both major surfaces of the rim. It is the elastomer surrounding rim 1 that makes it unnecessary to use gaskets, the elastomer molded around the rim taking the place of a gasket. The rim portion of the gasket is denoted in FIGS. 2 and 3 by the bracket labeled A.

In FIG. 2, the basic elements of the diaphragm, A, B and C are shown, the diaphragm being shown in its entirety. Center pan C is made up of a metal disc 2 bonded to elastomer 3. Elastomer 3 extends only part way across the diameter of center pan 2, thus making center pan 2 a rigid member bonded with flexible portion B, which in turn is integrally molded with rigid member (outer rim) A. Two holes are shown in center pan A by element 8. These are used when the diaphragm is in service, which is not here germane.

Referring to FIG. 3, there is shown rim portion A, integral with a flexing portion indicated by bracket labeled B. The flexing portion is made of three elements, namely two sidewalls 6 and median portion 7. It will be noted that one of sidewalls 6 is integrally molded with the rim portion A, the other sidewall 6 bonded with what is styled as a center pan, indicated by the bracket labeled C. One feature of the invention that should be carefully observed is that the median portion 7, which is integrally molded with sidewalls 6, has a thickness that is greater than the sidewalls 6. It can also have a thickness that is less than the thickness of rim portion A. It has been found that if the thickness ratio as shown in FIG. 3 and 2 between elements 6 and 7 is not observed, the diaphragm will be inoperable under operating conditions.

It has been found that an elastomer made by Engineering River Products, 1745 Coplem Road, Akron, Ohio, 44320, sold underneath the designation of 7A46-17 is a desirable compound out of which to mold the diaphragm in question. It has further been found that an elastomer that has a durometer hardness of no greater than 35, as determined by that procedure described in ASTM(d)-2240-68, is preferable. The ASTM procedure previously indicated is herein incorporated by reference in its entirety.

One of the biggest benefits of the diaphragm disclosed herein is that it can be manufactured with consistent uniformity. Quality control problems encountered during manufacturing procedures of this diaphragm are at a minimum because the entire unit is made in one operation, the metal members of the diaphragm being positively located in a steel mold. In mass produced items uniformity is an extremely important consideration. A meter manufacturer, using the diaphragm herein disclosed in the assembly of meters, is not only able to assemble meters at a faster rate, but the uniformity from one assembled meter to another minimizes the final calibration that is required when prior art diaphragms are used. Aside from the fact that gas meters themselves can be more quickly assembled, which is attributable to the absence of the use of gaskets, the diaphragm itself does not require one or more joining operations, which was the case with the prior art gas diaphragms.

The elastomer used in this novel gas diaphragm is chemically bonded to the diaphragm center pan and to the outer rim portion, identified by element 1. With this chemical bonding process, use of a light-weight center pan was possible. A light-weight center pan reduces the internal friction of moving parts in the gas meter thereby resulting in a diaphragm with a longer life. With the outer metal rim 1 embedded in the elastomer 4, there are no metal edges exposed for the diaphragm to rub against. Consequently, a longer life of the flexible portion of the diaphragm results. In prior art diaphragm construction, metal rim 1 was disposed adjacent to the flexing portion B and its associated sidewalls, the sidewalls consequently becoming worn at the place of contact where the sidewalls rubbed against the metal portion.

I claim

1. A one-piece meter diaphragm comprising:
   a. an annulus-shaped mounting rim composed of a metal annulus embedded in an elastomer;
   b. an elastomer flexing portion of U-shaped cross-section integral with the elastomer portion of said mounting rim comprising:
      i. a first sidewall disposed essentially perpendicular to that plane in which the mounting rim lies and integral with the elastomer inner periphery portion of same;
      ii. a second sidewall spaced apart from said first sidewall; and,
      iii. a median portion, disposed between and integral with both of said sidewalls, having a thickness greater than said sidewalls; and,
   c. a center pan bonded to said second sidewall.

2. A meter diaphragm as described in claim 1 wherein said center pan is composed of an elastomer having a metal member affixed thereto.

3. A meter diaphragm as described in claim 1 wherein said elastomer has a durometer hardness of no greater than 35 as determined by that procedure described in ASTM D-2240-68.

4. A meter diaphragm as described in claim 1 wherein the thickness of said median portion of said flexing portion is less than the thickness of said mounting rim.

* * * * *